United States Patent
Ziegler et al.

(10) Patent No.: US 12,174,734 B2
(45) Date of Patent: Dec. 24, 2024

(54) CODE SYNTHESIS MODEL EVALUATION HARNESSING REAL-WORLD CODE REPOSITORIES

(71) Applicant: Microsoft Technology Licensing, LLC, Redmond, WA (US)

(72) Inventors: Albert Ziegler, Uppsala (SE); Oegerikus De Moor, Tas-Sliema (MT); Balabhadra Graveley, San Francisco, CA (US); Johan Sebastian Heesemann Rosenkilde, Birkerød (DK); Edward Emil Aftandilian, Sunnyvale, CA (US); Max Schaefer, Kidlington (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 17/746,852

(22) Filed: May 17, 2022

(65) Prior Publication Data

US 2023/0376409 A1 Nov. 23, 2023

(51) Int. Cl.
*G06F 11/36* (2006.01)
*G06F 8/30* (2018.01)

(52) U.S. Cl.
CPC ...... *G06F 11/3692* (2013.01); *G06F 11/3688* (2013.01); *G06F 8/30* (2013.01)

(58) Field of Classification Search
CPC ..... G06F 11/36–3696; G06F 8/30; G06F 8/35
See application file for complete search history.

(56) References Cited

U.S. PATENT DOCUMENTS

| 10,983,761 | B2 * | 4/2021 | Svyatkovskiy | ........... G06F 8/33 |
| 2020/0249918 | A1 * | 8/2020 | Svyatkovskiy | ........ G06N 3/084 |
| 2023/0280985 | A1 * | 9/2023 | Hayashi | .................... G06F 8/10 717/104 |

(Continued)

OTHER PUBLICATIONS

Hendrycks D., et al., "Measuring Coding Challenge Competence With APPS", arXiv.org [online], Nov. 8, 2021 [retrieved Apr. 2, 2024], Retrieved from Internet: <URL: https://arxiv.org/pdf/2105.09938.pdf>, pp. 1-22.*

(Continued)

*Primary Examiner* — Todd Aguilera
(74) *Attorney, Agent, or Firm* — Workman Nydegger

(57) ABSTRACT

A computer system identifies a code synthesis model and a set of software repositories, each comprising corresponding source code and corresponding tests for testing the corresponding source code. The computer system tests a plurality of generated source code predictions using the set of software repositories. The testing includes, for each software repository in the set of software repositories, identifying a portion of the corresponding source code of the software repository that is covered by the corresponding tests of the software repository, using the code synthesis model to generate a source code prediction for the portion of the corresponding source code, and using the corresponding tests of the software repository to test the source code prediction that was generated using the code synthesis model. Based on testing the plurality of generated source code predictions using the set of software repositories, the computer system generates an evaluation of the code synthesis model.

20 Claims, 4 Drawing Sheets

(56) References Cited

U.S. PATENT DOCUMENTS

2024/0020096 A1* 1/2024 Chen ................. G06F 40/284

OTHER PUBLICATIONS

Rouse, M., "Installation", Techopedia [online], 2017 [retrieved Apr. 9, 2024], Retrieved from Internet: <URL: https://www.techopedia.com/definition/32115/installation>, whole document.*

Chen, M., et al., "Evaluating Large Language Models Trained on Code", arXiv.org [online], Jul. 14, 2021 [retrieved Apr. 2, 2024], Retreived from Internet: <URL: https://arxiv.org/pdf/2107.03374.pdf>, whole document.*

* cited by examiner

400

```
┌─────────────────────────────────────────────────────┐
│  Identify A Code Synthesis Model              401   │
└─────────────────────────────────────────────────────┘
                         │
                         ▼
┌─────────────────────────────────────────────────────┐
│  Identify A Set Of Software Repositories      402   │
└─────────────────────────────────────────────────────┘
                         │
                         ▼
┌─────────────────────────────────────────────────────┐
│ Test Generated Source Code Predictions In Each      │
│ Software Repository                            403  │
│  ┌───────────────────────────────────────────────┐  │
│  │ Identify A Portion Of Source Code In     404 │  │
│  │ A Software Repository                         │  │
│  └───────────────────────────────────────────────┘  │
│                     │                               │
│                     ▼                               │
│  ┌───────────────────────────────────────────────┐  │
│  │ Using The Code Synthesis Model, Generate 405 │  │
│  │ A Prediction For The Portion Of Source Code  │  │
│  └───────────────────────────────────────────────┘  │
│                     │                               │
│                     ▼                               │
│  ┌───────────────────────────────────────────────┐  │
│  │ Using The Software Repository's Tests,   406 │  │
│  │ Test The Prediction                           │  │
│  └───────────────────────────────────────────────┘  │
└─────────────────────────────────────────────────────┘
                         │
                         ▼
┌─────────────────────────────────────────────────────┐
│ Based On Testing The Generated Source Code          │
│ Predictions, Evaluate The Code Synthesis Model 407  │
└─────────────────────────────────────────────────────┘
```

*FIG. 4*

CODE SYNTHESIS MODEL EVALUATION HARNESSING REAL-WORLD CODE REPOSITORIES

BACKGROUND

In computing, artificial intelligence (AI) refers to the capability of a computer system to mimic human cognitive functions such as learning and problem-solving. Through AI, a computer system uses math and logic to simulate the reasoning that people use to learn from new information and make decisions. One application of AI is machine learning (ML), which creates and uses mathematical models of data. ML algorithms build a model based on sample data, known as training data, in order to make predictions or decisions without being explicitly programmed to do so. Examples of common ML algorithms include linear regression, logistic regression, k-nearest neighbors, support vector machines, naive bayes, decision tree, random forest, and k-means clustering.

One application of AI and ML is the creation of language synthesis models. Once trained, these models consume an input prompt comprising a portion of text in a particular language, and generate a prediction in that language of how to continue that text. Language synthesis models can be trained based on a variety of language types, such as natural languages (e.g., as spoken or written by humans) and/or computer languages (e.g., computer source code languages). When trained using computer languages, code language synthesis models (code synthesis models) can be used to synthesize code. In one application, such code synthesis models are integrated into a source code editor, such as within an integrated development environment (IDE), to provide AI/ML-based code completion suggestions that can, for example, provide suggestions for how to complete entire functions.

When creating and training language synthesis models, it is challenging to evaluate the quality of the predictions generated by the model. Given the precise nature of computer languages, where very small variations can lead to very different results and/or non-functional code, these challenges are amplified when evaluating code synthesis models.

BRIEF SUMMARY

In some aspects, the techniques described herein relate to a method, implemented at a computer system that includes a processor, for code synthesis model evaluation harnessing code repositories, the method including: identifying a code synthesis model; identifying a set of software repositories, each software repository in the set of software repositories including corresponding source code and corresponding tests for testing the corresponding source code; testing a plurality of generated source code predictions using the set of software repositories including, for each software repository in the set of software repositories: identifying a portion of the corresponding source code of the software repository that is covered by the corresponding tests of the software repository; using the code synthesis model, generating a source code prediction for the portion of the corresponding source code; and using the corresponding tests of the software repository, testing the source code prediction that was generated using the code synthesis model; and based on testing the plurality of generated source code predictions using the set of software repositories, generating an evaluation of the code synthesis model.

In some aspects, the techniques described herein relate to a computer system for code synthesis model evaluation harnessing code repositories, including: a processor; and a computer storage media that stores computer-executable instructions that are executable by the processor to cause the computer system to at least: identify a code synthesis model; identify a set of software repositories, each software repository in the set of software repositories including corresponding source code and corresponding tests for testing the corresponding source code; test a plurality of generated source code predictions using the set of software repositories including, for each software repository in the set of software repositories: identify a portion of the corresponding source code of the software repository that is covered by the corresponding tests of the software repository; using the code synthesis model, generate a source code prediction for the portion of the corresponding source code; and using the corresponding tests of the software repository, test the source code prediction that was generated using the code synthesis model; and based on testing the plurality of generated source code predictions using the set of software repositories, generate an evaluation of the code synthesis model.

In some aspects, the techniques described herein relate to a computer program product including a computer storage media that stores computer-executable instructions that are executable by a processor to cause a computer system to harness code repositories to evaluate a code synthesis model, the computer-executable instructions including instructions that are executable by the processor to cause the computer system to at least: identify the code synthesis model; identify a set of software repositories, each software repository in the set of software repositories including corresponding source code and corresponding tests for testing the corresponding source code; test a plurality of generated source code predictions using the set of software repositories including, for each software repository in the set of software repositories: identify a portion of the corresponding source code of the software repository that is covered by the corresponding tests of the software repository; using the code synthesis model, generate a source code prediction for the portion of the corresponding source code; and using the corresponding tests of the software repository, test the source code prediction that was generated using the code synthesis model; and based on testing the plurality of generated source code predictions using the set of software repositories, generate an evaluation of the code synthesis model.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 4 illustrates a flow chart of an example method for code synthesis model evaluation harnessing code repositories.

DETAILED DESCRIPTION

At least some embodiments described herein harness publicly available software repositories to test and/or validate code synthesis models. In particular, the embodiments herein harness code and tests contained in software repositories to evaluate source code predictions generated by code synthesis models. These embodiments include "blanking-out" portions of a repository's code and filling-in those blanked-out portions with predictions generated by a code synthesis model. These embodiments then determine if the repository's code—when modified with these prediction(s)—still passes the repository's own tests. When expanded to perform code blanking, prediction, and testing on code from a plurality of repositories, the embodiments herein are scalable to evaluate code synthesis models against a great variety of real-world software.

Figure 1:
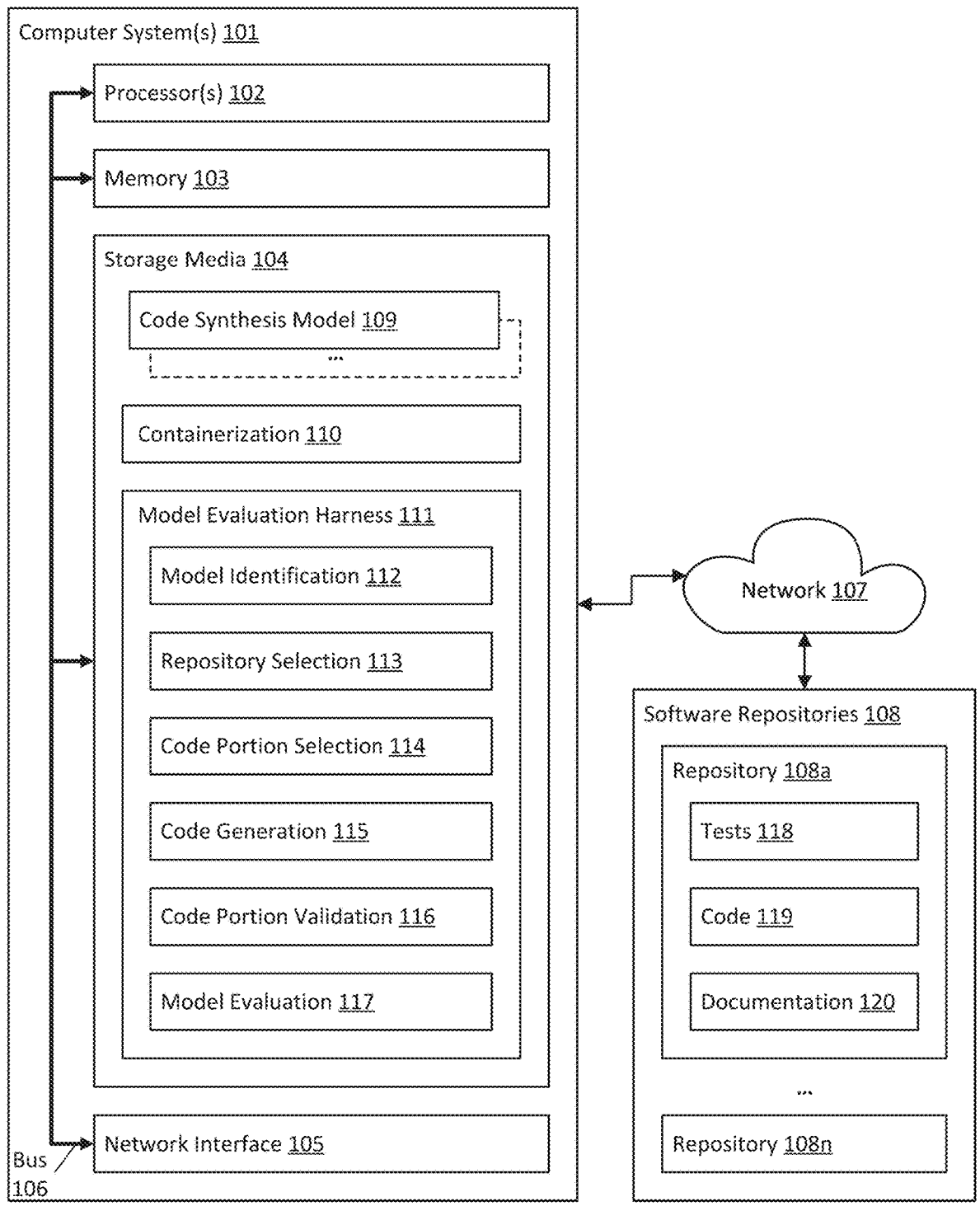
FIG. 1 illustrates an example computer architecture that facilitates harnessing real-world code repositories for code synthesis model evaluation.

FIG. 1 illustrates an example computer architecture 100 that facilitates harnessing real-world code repositories for code synthesis model evaluation. As shown, computer architecture 100 includes a computer system 101 (or a plurality of similarly-configured computer systems) comprising a processor 102 (e.g., a single processor, or a plurality of processors), memory 103 (e.g., system or main memory), storage media 104 (e.g., a single computer-readable storage medium, or a plurality of computer-readable storage media), all interconnected by a bus 106.

As shown, computer system 101 also includes a network interface 105 (e.g., one or more network interface cards) for interconnecting (via a network 107) to other computer system(s), such as computer system(s) hosting a plurality of software repositories 108. As shown, the software repositories 108 include a plurality of software repositories, including repository 108a to repository 108n. As exemplified by repository 108a, each repository of software repositories 108 includes code 119 (e.g., one or more source code files) and tests 118 (e.g., a set of unit tests) configured to validate the code 119. Additionally, in embodiments, a repository may include documentation 120, such as installation instructions, compilation instructions, and the like. In embodiments, the software repositories 108 include repositories obtained from public sources, such as GITHUB, PYPI, NPM, and the like. Thus, in embodiments, the software repositories 108 comprise a corpus of computer source code that has been found "in the real world," and thus software repositories 108 can represent a great variety of coding styles, techniques, and the like.

The storage media 104 is illustrated as storing computer-executable instructions implementing at least a model evaluation harness 111, and as storing a code synthesis model 109 (or a plurality of code synthesis models). In embodiments, the code synthesis model 109 is an ML model that is at least trained (e.g., based on a corpus of input source code examples) to generate a portion of a computer source code language, based on a prompt that is provided as input to the code synthesis model 109.

In general, the model evaluation harness 111 uses code (e.g., code 119) and tests (e.g., tests 118) contained in individual repositories (e.g., repository 108a) of software repositories 108 to evaluate source code predictions generated by the code synthesis model 109. Using repository 108a as an example, in embodiments the model evaluation harness 111 obtains and installs repository 108a. In embodiments, the model evaluation harness 111 uses a containerization component 110 to install repository 108a in an isolated manner (e.g., within a virtual machine, within a container). Once repository 108a is installed, the model evaluation harness 111 "blanks-out" portion(s) of the code 119 of the repository 108a, fills in those blanked-out portion(s) of code with prediction(s) generated by the code synthesis model 109, and then determines if the code 119— when modified to be filled in with these prediction(s)— passes the tests 118 of the repository 108a. In embodiments, the model evaluation harness 111 performs code blanking, prediction, and testing using each of a plurality of repositories within software repositories 108. Thus, the model evaluation harness 111 harnesses code and tests available within the software repositories 108 to evaluate the performance of the code synthesis model 109. When the software repositories 108 comprise a corpus of computer source code that has been found from public sources, such as GITGUB, PYPI, NPM, and the like, the model evaluation harness 111 evaluates the "real-world" performance of the code synthesis model 109.

Notably, the model evaluation harness 111 can be used to evaluate a plurality of code synthesis models (e.g., different versions of the same model, or different models entirely), and/or different pre- or post-processing regimes for a code synthesis model. Additionally, while the code synthesis model 109 is shown as residing in storage media 104, code synthesis models could alternatively reside at a different computer system, such as one available via the network 107.

As mentioned, in embodiments the model evaluation harness 111 performs code blanking, prediction, and testing using each of a plurality of repositories within software repositories 108. In embodiments, the model evaluation harness 111 distributes this work across a plurality of computer systems. Thus, while computer architecture 100 shows computer system 101 singly, in embodiments, computer architecture 100 includes a plurality of computer systems that include at least a subset of components of the model evaluation harness 111, the containerization component 110, etc.

FIG. 1 illustrates internal components of the model evaluation harness 111. As shown, in embodiments the model evaluation harness 111 includes a model identification component 112, a repository selection component 113, a code portion selection component 114, a code generation component 115, a code portion validation component 116, and a model evaluation component 117. Each internal component of the model evaluation harness 111 depicted in FIG. 1 represents various functionalities that the model evaluation harness 111 might implement in accordance with various embodiments described herein. It will be appreciated, however, that the depicted components—including their identity and arrangement—are presented merely as an aid in describing example embodiments of the model evaluation harness 111.

Figure 2:
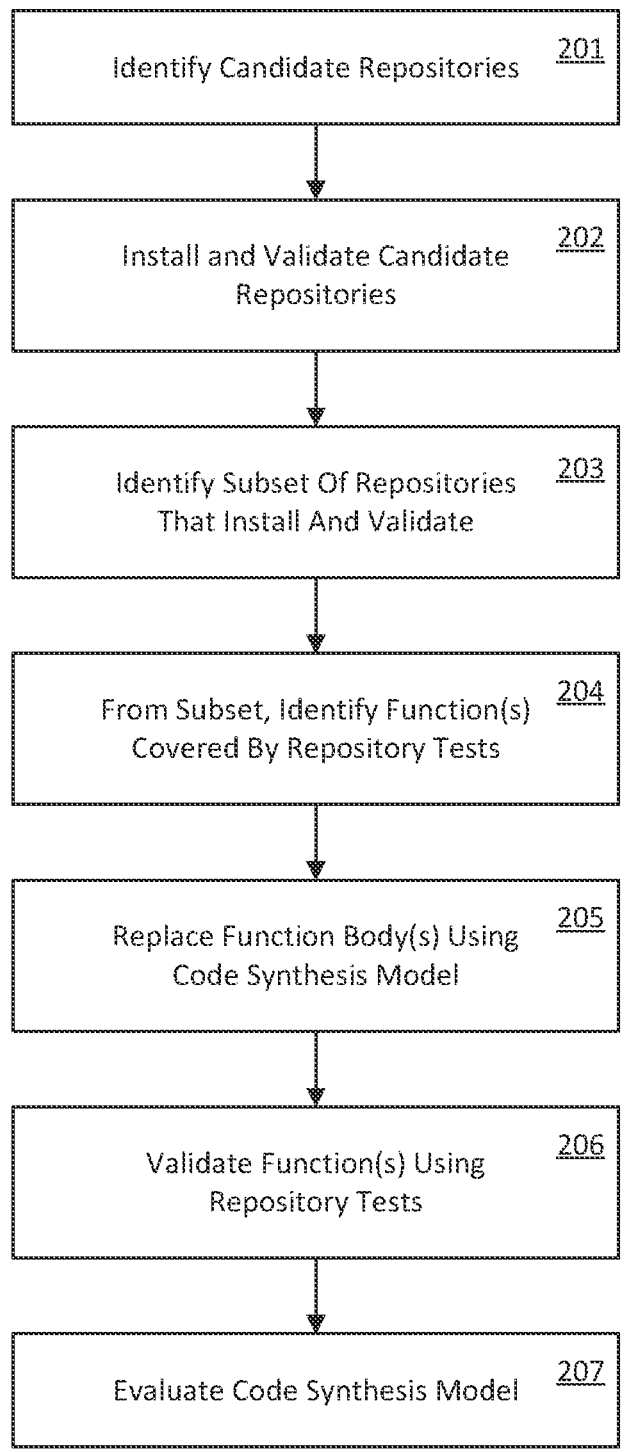
FIG. 2 illustrates an example of a process for code synthesis model evaluation using code repositories.

In order to demonstrate one example of operation of the model evaluation harness 111, FIG. 2 illustrates an example 200 of a process for code synthesis model evaluation using code repositories. Example 200 comprises a series of steps, step 201 to step 207. It will be appreciated that these steps are an example only, and are not limiting to the actions, or their orders, that could be performed by implementations of the model evaluation harness 111.

In step 201 to step 203, the model evaluation harness 111 uses the repository selection component 113 to identify a set of repositories (e.g., from software repositories 108), against which evaluate a code synthesis model 109 (or a plurality of code synthesis models) selected by the model identification component 112. In some embodiments, the model evaluation harness 111 initially identifies candidate repositories at step 201.

As mentioned, in embodiments, the model evaluation harness 111 identifies software repositories 108, such as public repositories available on GITGUB, PYPI, NPM, and the like. Since, in embodiments, these software repositories 108 are "real-world" repositories, it is possible that many of those repositories will not actually install (e.g., due to bugs or a lack of completeness) and/or lack tests. As such, in some embodiments as part of step 201 the repository selection component 113 performs an initial pre-screening such that it includes, in the candidate repositories, only those repositories that appear to be likely to install and/or that appear to have tests. In one example, the repository selection component 113 selects only repositories that appear to have documentation 120, such as one or more files that appear to have installation procedures, such as one or more files that appear to be scripts (such as install.sh or setup.py), specifications (such as requirements.txt), or instructions (such as install.md). In another example, the repository selection component 113 selects only repositories that appear to actually have tests, such as one or more files that have "test" as part of their file name (e.g., files matching the selection pattern, "*test*").

At step 202, the repository selection component 113 installs and validates each of the candidate repositories, resulting in identifying a subset of repositories that install and validate (step 203). In one example, the repository selection component 113 sets up an isolated execution environment (e.g., virtual machine, container) for each repository using the containerization component 110, fetches installation files (e.g., an archive) for the repository from a remote repository, copies/extracts the installation files into the isolated execution environment, installs dependencies (if needed) within the isolated execution environment, builds the repository (if appropriate to the programming language used), and executes any tests included in the repository. In embodiments, when executing tests included in the repository, the repository selection component 113 executes those tests multiples times to ensure they are deterministic (i.e., always fail or always pass). In embodiments, if no tests are discovered, none pass, or none are deterministic, the repository selection component 113 excludes this candidate repository from the subset. In some embodiments, some tests may pass while other tests fail or are non-deterministic. In these embodiments, the repository selection component 113 may either exclude the candidate repository from the subset when any test fails, or include the candidate repository in the subset but exclude any failing and/or non-deterministic test(s) from further consideration.

In some embodiments, as part of step 202, the repository selection component 113 tracks which test (or tests) exercises which part(s) of the repository's code. For example, the repository selection component 113 may determine which function(s) are executed by a given test. In embodiments, the repository selection component 113 can track which test(s) exercises which part(s) of the repository's code using code coverage analysis by a profiler, by a programming language-specific profiling capability, by instrumenting the repository's code, etc.

As will be appreciated, different repositories may configure their tests to be run in different ways. Additionally, there may be multiple configurations that run different subsets of a repository's tests. In embodiments, the repository selection component 113 attempts several different common commands for running a repository's tests, with those commands being selected based on the language/ecosystem of the repository, based on inspection of the repository's configuration files (e.g., documentation 120), and the like. Based on trying different commands, the repository selection component 113 may use the first command that works, use all commands together, or measure test coverage for each command and then use the one that gives the best coverage.

In some embodiments, as part of step 202, the repository selection component 113 determines if test(s) that have passed actually perform meaningful testing of the repository's code base. For example, the repository selection component 113 may modify a function exercised by particular test(s) to return a generic result, such as a common indication of an error (e.g., to return 0 or null, to raise a generic exception). Then, the repository selection component 113 runs those test(s) again and determines if they still pass. If so, then those test(s) do not appear to offer a very stringent quality control for the substituted function. Thus, the repository selection component 113 may exclude the candidate repository from the subset, or may include the candidate repository in the subset but exclude code parts containing the substituted function(s) in further processing as not being stringently tested. As a result, in step 203, the repository selection component 113 may identify repositories that install and properly validate.

Based on step 203, the repository selection component 113 has available to it a corpus of code, selected from among the subset of repositories that install and validate, that appears to be at least somewhat stringently tested by the repositories to which it belongs. In some embodiments, the code portion selection component 114 selects a plurality of code portions to use in validating the code synthesis model 109. In embodiments, a code portion comprises a function. However, a code portion can comprise any amount of code, such as a single line of code, a fixed number of lines of code, a paragraph, a class, and the like. For concreteness, example 200 refers to code portions comprising functions, though embodiments are not limited to functions. Thus, at step 204, from the subset of repositories identified in step 203, the code portion selection component 114 identifies function(s) covered by repository tests.

At step 205, the code generation component 115 replaces the function body of one or more functions using the code synthesis model. For example, for each function identified in step 203, code generation component 115 "blanks out" that function's body, and replaces it with code that is predicted for that function by the chosen code synthesis model.

Figure 3:
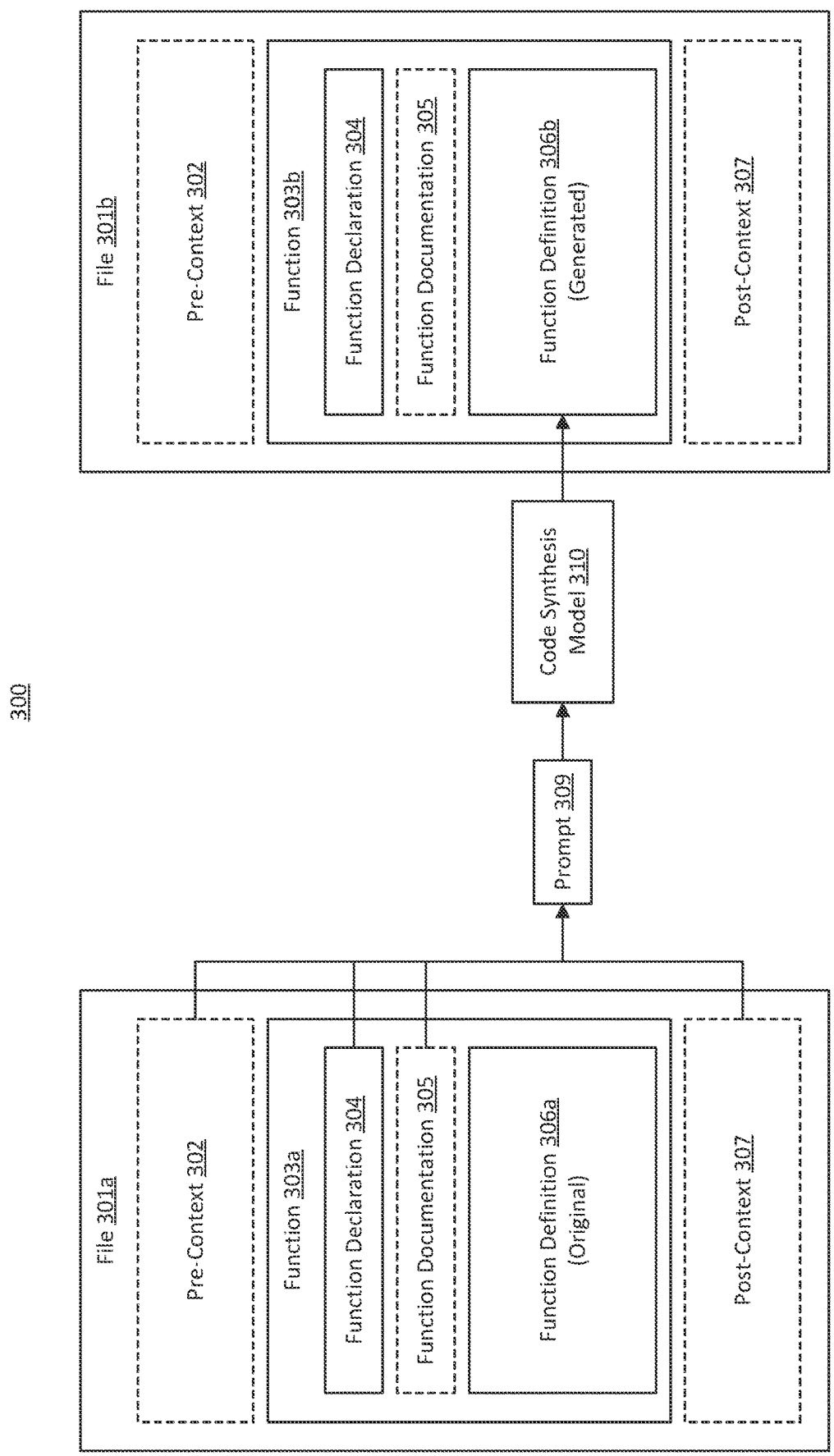
FIG. 3 illustrates an example of modifying a source code function with an ML-generated function definition.

In order to illustrate operation of the code generation component 115, and of step 205, FIG. 3 illustrates an example 300 of modifying a source code function with an ML-generated function definition. Example 300 shows a file 301a, such as a source code file included in code 119 of repository 108a. As shown, file 301a includes a function 303a, which may be a code portion selected by the code portion selection component 114 in step 204, and that includes a function declaration 304 (e.g., function return type, function name, function parameters) and a function definition 306a (e.g., function body). As shown, the function 303a may also include (or be associated with) function documentation 305 that describes operation of the function. In some instances (e.g., based on the programming language and/or documentation technology being used), the function documentation 305 appears prior to function declaration 304 in file 301a, while in other instances the function documentation 305 appears after function declaration 304 in file 301a. As shown, file 301a may contain content prior to the function 303a as pre-context 302 (e.g., other functions, variable declarations, comments, etc. appearing prior to function 303a) and/or may contain content subsequent to the function 303a as post-context 307 (e.g., other functions, variable declarations, comments, etc. appearing subsequent to function 303a).

In embodiments, the code generation component 115 provides one or more portions of the file 301a as a prompt 309 to a code synthesis model 310 (e.g., code synthesis model 109). In example 300, this includes one or more of the pre-context 302 (if present), the function declaration 304, the function documentation 305 (if present), or the post-context 307 (if present). In embodiments, this could include additional information, such as metadata associated with the file 301a (e.g., name, path), content from related files (e.g., other files in code 119), and the like. Notably, the function definition 306a is excluded from the prompt 309, such that it is "blanked-out" so far as the code synthesis model 310 is concerned.

As a result of providing the prompt 309 to the code synthesis model 310, the code synthesis model 310 generates predicted text, at least a portion of which is selected by the code generation component 115 as function definition 306b. As a result, the code generation component 115 generates a file 301b, which is a modification to file 301a that includes function 303b, and which comprises a generated version of function definition 306b in place of the original version of function definition 306a.

Although not expressly illustrated, after the code generation component 115 has replaced the function body of one or more functions using the code synthesis model, in embodiments the model evaluation harness 111 rebuilds all, or part, of the repository if that is appropriate for the programming language used. For example, the model evaluation harness 111 may rebuild file 301b and any dependencies. In some embodiments, the code generation component 115 produces predicted text that requires new and/or updated dependencies for the repository, and the model evaluation harness 111 also identifies and installs these new and/or updated dependencies.

After replacing one or more function bodies in step 205, and after potentially re-building all or part of the repository and/or installing additional dependencies, at step 206 the code portion validation component 116 validates each of those functions using tests from its corresponding repository. In particular, for each modified function, the code portion validation component 116 determines which test(s) exercise the function and executes those test(s). In embodiments, if the test(s) still pass the predication by the code synthesis model 109 is determined to have been successful, and if the test(s) do not pass, the predication by the code synthesis model 109 is determined to have been unsuccessful. For each test executed, the code portion validation component 116 records the result (e.g., success or failure) of the test.

At step 207, the model evaluation component 117 uses the results of step 206 to evaluate the code synthesis model. In an example, the model evaluation component 117 analyzes the validation results from step 206, to evaluate the successes and failures of the subject code synthesis model for generating code that passes validation tests provided by the software repositories 108.

Operation of the model evaluation harness 111 is now described further in connection with FIG. 4, which illustrates a flow chart of an example method 400 for code synthesis model evaluation harnessing code repositories. In embodiments, instructions for implementing method 400 are encoded as computer-executable instructions (e.g., model evaluation harness 111) stored on a computer storage media (e.g., storage media 104) that are executable by a processor (e.g., processor 102) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 4, method 400 comprises an act 401 of identifying a code synthesis model. In an example, the model identification component 112 identifies code synthesis model 109 stored at computer system 101, or at some other computer system. In embodiments, act 401 comprises identifying a single code synthesis model, while in other embodiments act 401 comprises identifying a plurality of code synthesis models (e.g., to evaluate those models against each other).

Method 400 also comprises an act 402 of identifying a set of software repositories. In some embodiments, act 402 comprises identifying a set of software repositories, each software repository in the set of software repositories comprising corresponding source code and corresponding tests for testing the corresponding source code. In an example, the repository selection component 113 identifies a plurality of software repositories, such as repository 108a to repository 108n, that will be used to test the code synthesis model(s) identified in act 401. As represented in repository 108a, each repository can include code 119 and tests 118 for that code.

In some embodiments, the set of software repositories identified in act 402 have been verified to be installable, to have working tests, and/or to have stringent tests. However, as discussed, in embodiments the repository selection component 113 identifies repositories that may not meet one or more of the foregoing. Thus, in some embodiments of act 402, the set of software repositories identified in act 402 have been selected from among a corpus of candidate repositories. Thus, in some embodiments of method 400, identifying the set of software repositories comprises the repository selection component 113 identifying a plurality of software repositories as candidate software repositories. Then, for each software repository in the plurality of software repositories, method 400 includes the repository selection component 113 installing the software repository (e.g., in an isolated environment using containerization component 110); executing the corresponding tests of the software repository; and, based on executing the corresponding tests of the software repository, either adding the software repository to the set of software repositories, or excluding the software repository from the set of software repositories.

As discussed, just because a repository's tests pass does not mean that those tests are actually stringent; for example, a non-stringent test may only determine that a function executed. Thus, in some embodiments, the repository selection component 113 validates those tests using generic results (e.g., by simulating a function returning 0 or null, by raising a generic exception). Thus, in some embodiments of method 400, executing the corresponding tests of the software repository includes the repository selection component 113 validating the corresponding tests based on inputting a generic result to the corresponding tests. Then, the software repository is added to the set of software repositories by the repository selection component 113 only when successfully validating the corresponding tests based on providing the corresponding tests with the generic result.

In embodiments, as part of executing a repository's tests, the repository selection component 113 determines code coverage of each test. Thus, in some embodiments of method 400, executing the corresponding tests for the software repository includes identifying a subset of the corresponding source code of the software repository that is covered by the corresponding tests of the software repository. An effect of determining code coverage of each test is to inform which portion(s) of code to select later in act 404.

Method 400 also comprises an act 403 of testing generated source code predictions in each software repository. In some embodiments, act 403 comprises testing a plurality of generated source code predictions using the set of software repositories. In embodiments, this testing includes, for each software repository in the set of software repositories, performing act 404 to act 406. A broken arrow within FIG. 4 indicates that, for a given software repository, act 404 to act 406 may be repeated any number of times based on any number of code portions within the software repository. As such, a single software repository can generate many (e.g., tens, hundreds, or even thousands) data points—such as at least one data point for each sufficiently-tested function within the software repository.

Act 403 comprises an act 404 of identifying a portion of source code in a software repository. In some embodiments, act 404 comprises identifying a portion of the corresponding source code of a software repository that is covered by the corresponding tests of the software repository. In an example, the code portion selection component 114 identifies at last one portion of code within code 119 of repository 108a. As mentioned, portions of code can include functions, single lines of code, a fixed number of lines of code, a paragraph, a class, and the like. As illustrated in FIG. 3, in one example, the portion of the corresponding source code is a function, such as function 303a in file 301a.

Act 403 also comprises an act 405 of, using the code synthesis model, generating a prediction for the portion of source code. In some embodiments, act 405 comprises, using the code synthesis model, generating a source code prediction for the portion of the corresponding source code. In an example, the code generation component 115 generates a prompt based at least on the portion of source code identified in act 404, and provide this prompt to the code synthesis model 109. As a result, the code synthesis model 109 generates a prediction of code that could follow the prompt. The code generation component 115 then integrates this prediction into the portion of source code (e.g., as a new or modified source code file). Referring again to FIG. 3, in one example, the portion of the code generation component 115 generates prompt 309 comprising one or more of pre-context 302, function declaration 304, function documentation 305, or post-context 307. Based on inputting the prompt 309 to the code synthesis model 310, the code generation component 115 obtains and integrates the function definition 306b into file 301b.

Notably, in act 405, the code generation component 115 could generate code predictions for the same code portion using a plurality of code synthesis models (e.g., to compare different code synthesis models). Additionally, or alternatively, in act 405 the code generation component 115 could generate a plurality of code predictions for the same code portion using the same code synthesis model (e.g., after adjusting one or more parameters of the code synthesis model with each prediction). Thus, for example, in some embodiments of act 405, generating the source code prediction for the portion of the corresponding source code comprises, using the code synthesis model, or using different code synthesis models, generating a plurality of source code predictions for the portion of the corresponding source code.

As can be appreciated in view of the foregoing disclosure, in embodiments, generating the source code prediction for the portion of the corresponding source code comprises providing the code synthesis model with a prompt comprising one or more of: the portion of the corresponding source code, function pre-context for the portion of the corresponding source code, function post-context for the portion of the corresponding source code, or function documentation for the portion of the corresponding source code. In embodiments, when the portion of the corresponding source code comprises a source code function (e.g., as demonstrated in FIG. 3), then generating the source code prediction for the portion of the corresponding source code comprises providing the code synthesis model with a prompt comprising at least a function declaration for the source code function; and generating the source code prediction for the portion of the corresponding source code comprises generating a function definition for the source code function.

Act 403 also comprises an act 406 of, using the software repository's tests, testing the prediction. In some embodiments, act 406 comprises, using the corresponding tests of the software repository, testing the source code prediction that was generated using the code synthesis model. In an example, the code portion validation component 116 runs one or more of the tests 118 of repository 108a that exercises the portion(s) of code that were modified in act 405, and records the result (e.g., pass or fail). Act 406 therefore has the effect of using a repository's own tests to determine if the code synthesis model being evaluated can produce code that is sufficient to generate code that functions in substantially the same manner as the originally-written code against which the test(s) were designed.

As mentioned in connection with act 405, in embodiments the code generation component 115 could generate code predictions for the same code portion using a plurality of code synthesis models and/or could generate a plurality of code predictions for the same code portion using the same code synthesis model. Thus, for example, in some embodiments of act 406, testing the source code prediction that was generated using the code synthesis model comprises, using the corresponding tests of the software repository, testing each source code prediction of the plurality of source code predictions.

Method 400 also comprises an act 407 of, based on testing the generated source code predictions, evaluating the code synthesis model. In some embodiments, act 407 comprises, based on testing the plurality of generated source code predictions using the set of software repositories, generating an evaluation of the code synthesis model. In an example, the model evaluation component 117 analyzes the results of having carried out act 404 to act 406 for each of a plurality of repositories in software repositories 108. In particular, the model evaluation component 117 analyzes the results, generated by the code portion validation component 116 when carrying out act 406 on each repository, to analyze the successes and failures of code synthesis model 109 to successfully generate code that passes validation tests provided by the software repositories 108. Act 407 therefore has the effect of harnessing the code and rests from a plurality of software repositories to evaluate the performance of a code synthesis model.

In embodiments, evaluating the code synthesis model in act 407 comprises compiling a count of successes and failures, and determine how successful the code synthesis model was at producing code that passed repository tests. Thus, in some embodiments of act 407, generating the evaluation of the code synthesis model comprises identifying a success rate or a failure rate of the code synthesis model.

In embodiments, evaluating the code synthesis model in act 407 comprises comparing metadata generated by code synthesis model 109, itself, to the results of act 406. For example, when generating a prediction, code synthesis model 109 may generate a confidence in that prediction (e.g., as a number between 0.0 and 1.0). The model evaluation component 117 can then correlate these confidence predictions with the test results (e.g., to determine if the code synthesis model correctly gauges its confidence in its predictions). Thus, in some embodiments of act 407, generating the evaluation of the code synthesis model comprises comparing metadata of the code synthesis model with results of testing the plurality of generated source code predictions using the set of software repositories.

In embodiments, evaluating the code synthesis model in act 407 comprises identifying situations in when the code synthesis model was successful (or unsuccessful) in generating code that passes tests. For example, the model evaluation component 117 may determine if there is a correlation between a length of the generated code, and a success rate of testing the generated code (e.g., perhaps the code synthesis model is generally successful when generating ten or fewer lines of code, but is generally unsuccessful when generating more than ten lines of code). Thus, in some embodiments of act 407, generating the evaluation of the code synthesis model comprises identifying a situation in which the code synthesis model was successful or unsuccessful.

In some embodiments, the model evaluation harness 111 may automatically accept (e.g., deploy) or reject (e.g., retire) a code synthesis model based on the evaluation in act 407. Thus, embodiments of method 400 also include, based on generating the evaluation of the code synthesis model, automatically accepting, or rejecting, the code synthesis model.

As indicated, method 400 can be used to evaluate different versions of a code synthesis model. Thus, in embodiments, method 400 comprises generating a second evaluation of a different version of the code synthesis model, and comparing the evaluation of the code synthesis model with the second evaluation of the different version of the code synthesis model. In embodiments, this evaluation can be used to choose one version of the code synthesis model as being more (or less) successful at producing generated code than another version of the code synthesis model.

In addition to measuring the quality of predictions generated by a code synthesis model, based on running a repository's tests on those predictions, some embodiments may also combine those tests with other quality measures. For example, embodiments may compare an original code portion (e.g., function definition 306a) with a generated code portion (e.g., function definition 306b) to determine if they exactly or substantially match, or may determine if a generated code portion (e.g., function definition 306b) passes a source code syntax checker.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for code synthesis model evaluation harnessing code repositories, the method comprising:
   identifying a code synthesis model;
   identifying a set of software repositories, each software repository in the set of software repositories comprising corresponding source code and corresponding tests for testing the corresponding source code, wherein identifying the set of software repositories comprises:
      identifying a plurality of software repositories as candidate software repositories; and
      for each software repository in the plurality of software repositories:
         installing the software repository;
         executing the corresponding tests of the software repository, including validating the corresponding tests based on inputting an indication of an error to the corresponding tests; and
         based on executing the corresponding tests of the software repository, either:
            adding the software repository to the set of software repositories upon successfully validating the corresponding tests based on providing the corresponding tests with the indication of an error, or
            excluding the software repository from the set of software repositories;
   testing a plurality of generated source code predictions using the set of software repositories including, for each software repository in the set of software repositories:
      identifying a portion of the corresponding source code of the software repository that is covered by the corresponding tests of the software repository,
      using the code synthesis model, generating a source code prediction for the portion of the corresponding source code, and
      using the corresponding tests of the software repository, testing the source code prediction that was generated using the code synthesis model; and based on testing the plurality of generated source code predictions using the set of software repositories, generating an evaluation of the code synthesis model.

2. The method of claim 1, wherein executing the corresponding tests for the software repository includes identifying a subset of the corresponding source code of the software repository that is covered by the corresponding tests of the software repository.

3. The method of claim 1, wherein generating the evaluation of the code synthesis model comprises at least one of:
identifying a success rate or a failure rate of the code synthesis model;
comparing metadata of the code synthesis model with results of testing the plurality of generated source code predictions using the set of software repositories; or
identifying a situation in which the code synthesis model was successful or unsuccessful.

4. The method of claim 1, further comprising, based on generating the evaluation of the code synthesis model, automatically accepting, or rejecting, the code synthesis model.

5. The method of claim 1, wherein generating the source code prediction for the portion of the corresponding source code comprises providing the code synthesis model with a prompt comprising one or more of:
the portion of the corresponding source code,
function pre-context for the portion of the corresponding source code,
function post-context for the portion of the corresponding source code, or
function documentation for the portion of the corresponding source code.

6. The method of claim 1, wherein the portion of the corresponding source code comprises a source code function, and wherein:
generating the source code prediction for the portion of the corresponding source code comprises providing the code synthesis model with a prompt comprising at least a function declaration for the source code function; and
generating the source code prediction for the portion of the corresponding source code comprises generating a function definition for the source code function.

7. The method of claim 1, wherein:
generating the source code prediction for the portion of the corresponding source code comprises, using the code synthesis model, generating a plurality of source code predictions for the portion of the corresponding source code; and
testing the source code prediction that was generated using the code synthesis model comprises, using the corresponding tests of the software repository, testing each source code prediction of the plurality of source code predictions.

8. The method of claim 1, further comprising:
generating a second evaluation of a different version of the code synthesis model; and
comparing the evaluation of the code synthesis model with the second evaluation of the different version of the code synthesis model.

9. The method of claim 1, wherein the method further comprises, based on the evaluation of the code synthesis model, automatically deploying the code synthesis model.

10. The method of claim 1, wherein inputting the indication of an error to the corresponding tests comprises at least one of simulating a function returning zero, simulating a function returning null, or simulating raising of an exception.

11. A computer system for code synthesis model evaluation harnessing code repositories, comprising:
a processor; and
a computer storage media that stores computer-executable instructions that are executable by the processor to cause the computer system to at least:
identify a code synthesis model;
identify a set of software repositories, each software repository in the set of software repositories comprising corresponding source code and corresponding tests for testing the corresponding source code, wherein identifying the set of software repositories comprises:
identifying a plurality of software repositories as candidate software repositories; and
for each software repository in the plurality of software repositories:
installing the software repository;
executing the corresponding tests of the software repository, including validating the corresponding tests based on inputting an indication of an error to the corresponding tests; and
based on executing the corresponding tests of the software repository, either:
adding the software repository to the set of software repositories upon successfully validating the corresponding tests based on providing the corresponding tests with the indication of an error, or
excluding the software repository from the set of software repositories;
test a plurality of generated source code predictions using the set of software repositories including, for each software repository in the set of software repositories:
identify a portion of the corresponding source code of the software repository that is covered by the corresponding tests of the software repository,
using the code synthesis model, generate a source code prediction for the portion of the corresponding source code, and
using the corresponding tests of the software repository, test the source code prediction that was generated using the code synthesis model; and
based on testing the plurality of generated source code predictions using the set of software repositories, generate an evaluation of the code synthesis model.

12. The computer system of claim 11, wherein executing the corresponding tests for the software repository includes identifying a subset of the corresponding source code of the software repository that is covered by the corresponding tests of the software repository.

13. The computer system of claim 11, wherein generating the evaluation of the code synthesis model comprises at least one of:
identifying a success rate or a failure rate of the code synthesis model;
comparing metadata of the code synthesis model with results of testing the plurality of generated source code predictions using the set of software repositories; or
identifying a situation in which the code synthesis model was successful or unsuccessful.

14. The computer system of claim 11, the computer-executable instructions also including instructions that are executable by the processor to cause the computer system to, based on generating the evaluation of the code synthesis model, automatically accept or reject the code synthesis model.

15. The computer system of claim 11, wherein generating the source code prediction for the portion of the corresponding source code comprises providing the code synthesis model with a prompt comprising one or more of:
the portion of the corresponding source code,
function pre-context for the portion of the corresponding source code,
function post-context for the portion of the corresponding source code, or
function documentation for the portion of the corresponding source code.

16. The computer system of claim 11, wherein the portion of the corresponding source code comprises a source code function, and wherein:
generating the source code prediction for the portion of the corresponding source code comprises providing the code synthesis model with a prompt comprising at least a function declaration for the source code function; and
generating the source code prediction for the portion of the corresponding source code comprises generating a function definition for the source code function.

17. The computer system of claim 11, wherein:
generating the source code prediction for the portion of the corresponding source code comprises, using the code synthesis model, generating a plurality of source code predictions for the portion of the corresponding source code; and
testing the source code prediction that was generated using the code synthesis model comprises, using the corresponding tests of the software repository, testing each source code prediction of the plurality of source code predictions.

18. The computer system of claim 11, wherein the computer-executable instructions that are also executable to cause the computer system to, based on the evaluation of the code synthesis model, automatically deploy the code synthesis model.

19. A hardware storage device that stores computer-executable instructions that are executable by a processor to cause a computer system to harness code repositories to evaluate a code synthesis model, the computer-executable instructions including instructions that are executable by the processor to cause the computer system to at least:
identify the code synthesis model;
identify a set of software repositories, each software repository in the set of software repositories comprising corresponding source code and corresponding tests for testing the corresponding source code, wherein identifying the set of software repositories comprises:
identifying a plurality of software repositories as candidate software repositories; and
for each software repository in the plurality of software repositories:
installing the software repository;
executing the corresponding tests of the software repository, including validating the corresponding tests based on inputting an indication of an error to the corresponding tests; and
based on executing the corresponding tests of the software repository, either:
adding the software repository to the set of software repositories upon successfully validating the corresponding tests based on providing the corresponding tests with the indication of an error, or
excluding the software repository from the set of software repositories;
test a plurality of generated source code predictions using the set of software repositories including, for each software repository in the set of software repositories:
identify a portion of the corresponding source code of the software repository that is covered by the corresponding tests of the software repository,
using the code synthesis model, generate a source code prediction for the portion of the corresponding source code, and
using the corresponding tests of the software repository, test the source code prediction that was generated using the code synthesis model; and
based on testing the plurality of generated source code predictions using the set of software repositories, generate an evaluation of the code synthesis model.

20. The hardware storage device of claim 19, wherein the computer-executable instructions that are also executable to cause the computer system to, based on the evaluation of the code synthesis model, automatically deploy the code synthesis model.

* * * * *